United States Patent
Mittal et al.

(10) Patent No.: US 9,428,617 B2
(45) Date of Patent: Aug. 30, 2016

(54) α,ω-FUNCTIONALIZED POLYOXYALKYLENE-SILOXANE POLYMERS AND COPOLYMERS MADE THEREFROM

(71) Applicant: Momentive Performance Materials Inc., Waterford, NY (US)

(72) Inventors: Anuj Mittal, Bangalore (IN); Laxmi Samantara, Bangalore (IN); Samim Alam, Tarrytown, NY (US); Anubhav Saxena, Bangalore (IN); Indumathi Ramakrishnan, Bangalore (IN); Roy U. Rojas-Wahl, Teaneck, NJ (US)

(73) Assignee: Momentive Performance Material Inc., Waterford, NY (US)

( * ) Notice: Subject to any disclaimer, the term of this patent is extended or adjusted under 35 U.S.C. 154(b) by 0 days.

(21) Appl. No.: 14/858,169

(22) Filed: Sep. 18, 2015

(65) Prior Publication Data

US 2016/0083528 A1    Mar. 24, 2016

Related U.S. Application Data

(60) Provisional application No. 62/052,068, filed on Sep. 18, 2014.

(51) Int. Cl.
| | | |
|---|---|---|
| C08G 77/46 | (2006.01) | |
| C08G 77/448 | (2006.01) | |
| C08L 69/00 | (2006.01) | |
| C08G 77/14 | (2006.01) | |
| C08L 83/10 | (2006.01) | |
| C08L 83/12 | (2006.01) | |
| C08G 77/00 | (2006.01) | |

(52) U.S. Cl.
CPC ............. *C08G 77/46* (2013.01); *C08G 77/14* (2013.01); *C08G 77/448* (2013.01); *C08L 69/00* (2013.01); *C08L 83/10* (2013.01); *C08L 83/12* (2013.01); *C08G 77/70* (2013.01)

(58) Field of Classification Search
None
See application file for complete search history.

(56) References Cited

U.S. PATENT DOCUMENTS

| | | | | |
|---|---|---|---|---|
| 3,957,842 A * | 5/1976 | Prokai | ............... | C08G 18/4072 521/111 |
| 5,661,202 A | 8/1997 | Akamatsu et al. | | |
| 5,767,219 A * | 6/1998 | Takarada | ............... | C08G 77/46 528/15 |
| 5,869,727 A * | 2/1999 | Crane | ................. | C08G 77/46 556/444 |
| 6,072,011 A * | 6/2000 | Hoover | ................ | C08G 77/448 524/162 |
| 7,709,581 B2 | 5/2010 | Glasgow et al. | | |
| 7,888,447 B2 | 2/2011 | Dhara et al. | | |
| 7,896,929 B2 * | 3/2011 | Nguyen | ................. | C08G 77/46 8/115.51 |
| 8,426,532 B2 | 4/2013 | Huang et al. | | |
| 8,481,640 B2 * | 7/2013 | Gough | ................... | C08G 77/46 524/588 |
| 8,871,875 B2 * | 10/2014 | Kim | ..................... | C08G 64/186 525/464 |
| 2008/0029744 A1 * | 2/2008 | Jansen | ................... | C08L 55/02 252/601 |
| 2008/0081860 A1 | 4/2008 | Li et al. | | |
| 2010/0010135 A1 | 1/2010 | Brand et al. | | |
| 2013/0289193 A1 * | 10/2013 | Ahn | ....................... | C08L 69/00 524/505 |

FOREIGN PATENT DOCUMENTS

| | | |
|---|---|---|
| EP | 0570208 A2 | 5/1993 |
| EP | 0778305 A1 | 11/1997 |
| EP | 2559806 A1 | 2/2013 |
| JP | H10232503 A | 9/1998 |

OTHER PUBLICATIONS

Patent Cooperation Treaty, Notification of Transmittal of the International Search Report and the Written Opinion of the International Searching Authority, or the Declaration for PCT/US2015/050883 mailed Jan. 19, 2016, 13 pages.

* cited by examiner

*Primary Examiner* — Robert S Loewe
(74) *Attorney, Agent, or Firm* — Hoffman Warnick LLC

(57) ABSTRACT

An α,ω-functionalized polyoxyalkylene-siloxane polymer having the general structural Formula (I):

$$A-\left[O-\underset{R_2}{\underset{|}{\overset{R_2}{\overset{|}{Si}}}}\right]_x\left[O-\underset{R_3}{\underset{|}{\overset{R_3}{\overset{|}{Si}}}}\right]_y O-\underset{R_1}{\underset{|}{\overset{R_1}{\overset{|}{Si}}}}-\underset{R_{12}}{}\left(O\right)_n$$

$$\left(O\underset{CH_3}{\underset{|}{}}\right)_m O-\underset{R_{12}}{}\underset{R_1}{\underset{|}{\overset{R_1}{\overset{|}{Si}}}}-\left[O-\underset{R_2}{\underset{|}{\overset{R_2}{\overset{|}{Si}}}}\right]_x\left[O-\underset{R_3}{\underset{|}{\overset{R_3}{\overset{|}{Si}}}}\right]_y O-A$$

(I)

provides improved hydrophilicity and hemocompatibility. The α,ω-functionalized polyoxyalkylene-siloxane polymer may be used to make various polycarbonate/α,ω-functionalized polyoxyalkylene-siloxane copolymers and polymer blends, as well as articles including such copolymers and blends.

19 Claims, No Drawings

α,ω-FUNCTIONALIZED POLYOXYALKYLENE-SILOXANE POLYMERS AND COPOLYMERS MADE THEREFROM

FIELD OF THE INVENTION

The invention is directed to α,ω-functionalized polyoxyalkylene-siloxane polymers and copolymers made therefrom.

BACKGROUND OF THE INVENTION

Polycarbonate resins are well-known thermoplastic resins which have long been used in a variety of applications, including medical applications, due to their very high optical clarity, resistance to impact, high dimensional stability, and heat resistance. However, polycarbonate can sometimes have adverse effects in medical applications where they are in contact with blood, protein, and lipid solutions. For instance, when blood comes into contact with a conventional polycarbonate, there is a possibility of a reduction in the platelet count of the blood. When a solution containing protein contacts conventional polycarbonate, a layer of protein is sometimes deposited on the surface of the polymer. Previous attempts have used a hydrophilic polycarbonate surface coating, such as a layer of hydrophilic hemocompatible coatings. However, this requires the added step of coating following extruding and molding of the articles.

Relevant surface treatments are disclosed in EP 2559806 (A1). A method is disclosed of improving hydrophilicity of a polycarbonate by a surface plasma treatment involving an He, Hs, Kr, Ne, $N_2$, and Xe gas mixture.

U.S. Pat. No. 5,661,202, EP 0570208A2, U.S. Pat. No. 7,709,581, U.S. Patent Pub. No. 20080081860, discloses Eugenol terminated fluids with different substituents in the backbone or pendant broadly.

U.S. Pat. No. 8,426,532 discloses the use of sulfonation techniques to introduce hydrophilic functionality on the molecules. Different additives can also be added to increase the hydrophilicity, some additives become surface active only after conditioning under specific conditions, while some additives are miscible with polycarbonate. However, these reduce the glass transition which will affect the processing. Further, even if these additives are thermally stable and surface active, they may not be permanent due to the lack of chemical bonding between the polymer matrix and additive.

U.S. Pat. No. 8,426,532 discloses polycarbonate graft copolymers comprising polycarbonate in the backbone and pendant chains grafted to polycarbonate backbone. These pendant chains are derived from a radically polymerizable unsaturated monomer of vinylpyrorolidone, an acrylate, styrene, dialkyl siloxane and perfluorinated vinyl compound.

U.S. Pat. No. 7,888,447 discloses the preparation of polycarbonate-polysiloxane copolymeric compositions with poly (oxyalkyl) group as pendant and material made having improved hemocompatibility. However, this type of copolymer could have random distribution of the hydrophilic moiety.

There remains a need for a polycarbonate composition with improved hemocompatibility and hydrophilicity and better pigment dispersion in polycarbonate-polysiloxane copolymeric composition that exhibits improved hemocompatibility and hydrophilicity.

SUMMARY

Accordingly, it has been found that certain polycarbonate-polyoxyalkylene siloxane copolymer compositions having a random siloxane block structure that can provide tunable properties in addition to improved hydrophilicity and hemocompatibility compared to conventional blends, additives, and copolymers.

The α,ω-functionalized polyoxyalkylene-siloxane polymers of the present invention have the structural Formula (I):

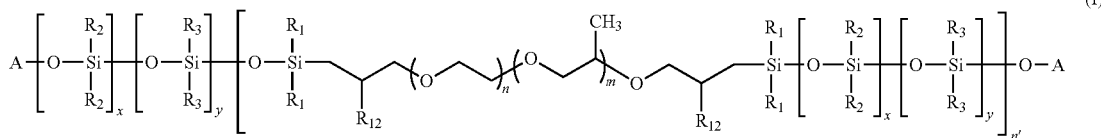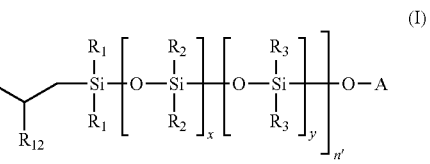

wherein each R, $R_1$, $R_2$ and $R_3$ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein at least one $R_2$ is different from at least one $R_3$; $R_{12}$ is independently hydrogen or methyl;

A is

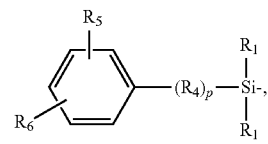

wherein $R_4$ is independently a divalent linear or branched alkylene group having from 1 to 10 carbon atoms, an aralkylene group having from 7 to 12 carbon atoms, an unsubstituted or substituted arylene group having from 6 to 18 carbon atoms, hydrocarbylene group having from 2 to 10 carbon atoms and containing at least one heteroatom of oxygen, $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms, $R_6$ is independently a hydroxyl group, an amine group, a carboxylic acid chloride group or a sulfonyl halide group, and the subscript p is an integer 0 or 1; and wherein m, n, n', x and y are integers, and wherein m is from 0 to 120, n is from 1 to 120, n' is from 1 to 10, x is from 1 to 300, and y is from 0 to 100, with the proviso that the sum of n+m is greater than or equal to 2.

In an embodiment, the present invention is directed to a copolymer comprising the following structural unit of Formula (II):

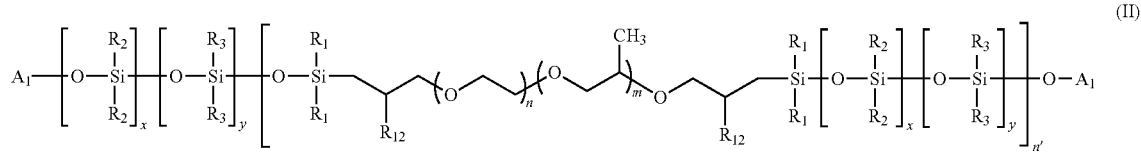

wherein each R, $R_1$, $R_2$ and $R_3$ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein at least one $R_2$ is different from at least one $R_3$; $R_{12}$ is independently hydrogen or methyl;

$A_1$ is

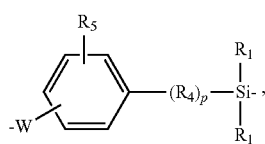

wherein $R_4$ is independently a divalent linear or branched alkylene group having from 1 to 10 carbon atoms, an aralkylene group having from 7 to 12 carbon atoms, an unsubstituted or substituted arylene group having from 6 to 18 carbon atoms, hydrocarbylene group having from 2 to 10 carbon atoms and containing at least one heteroatom of oxygen, $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms, W is independently a divalent group selected from the group consisting of —O—, —NR—, —C(=O)O— and —S(=O)$_2$O—, and the subscript p is an integer 0 or 1; and wherein m, n, n', x and y are integers, and wherein m is from 0 to 120, n is from 1 to 120, n' is from 1 to 10, x is from 1 to 300, and y is from 0 to 100, with the proviso that the sum of n+m is greater than or equal to 2.

In another embodiment, the present invention relates to a method of preparing a polysiloxane copolymer, wherein said method comprises polymerizing a α,ω-functionalized polyoxyalkylene-siloxane polymer represented by the structural Formula (I):

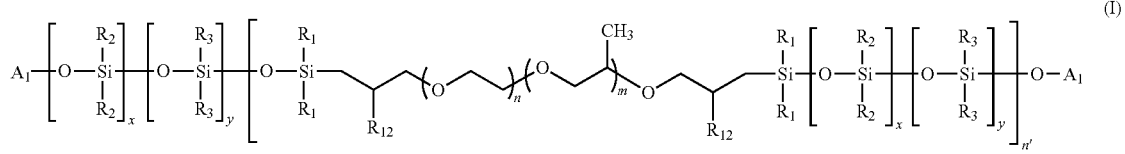

wherein each R, $R_1$, $R_2$ and $R_3$ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein at least one $R_2$ is different from at least one $R_3$; $R_{12}$ is independently hydrogen or methyl;

A is wherein $R_4$ is independently a divalent linear or branched alkylene group having from 1 to 10 carbon atoms, an aralkylene group having from 7 to 12 carbon atoms, an unsubstituted or substituted arylene group having from 6 to 18 carbon atoms, hydrocarbylene group having from 2 to 10 carbon atoms and containing at least one heteroatom of oxygen, $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms, $R_6$ is independently a hydroxyl group, an amine group, a carboxylic acid chloride group or a sulfonyl halide group, and the subscript p is an integer 0 or 1; wherein m, n, n', x and y are integers, and wherein m is from 0 to 120, n is from 1 to 120, n' is from 1 to 10, x is from 1 to 300, and y is from 0 to 100, with the proviso that the sum of n+m is greater than or equal to 2, with an activated carbonyl such as, but not limited to phosgene or diphenyl carbonate, in the presence of a compound represented by the structural Formula (III):

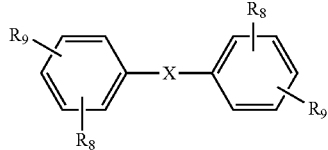
(III)

where $R_8$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; and $R_9$ is independently a hydroxyl group, an amine group, a carboxylic acid chloride group, or a sulfonyl halide group; and X is a compound represented by a structural formula selected from the group consisting of:

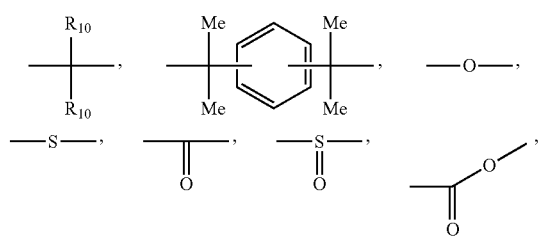

-continued

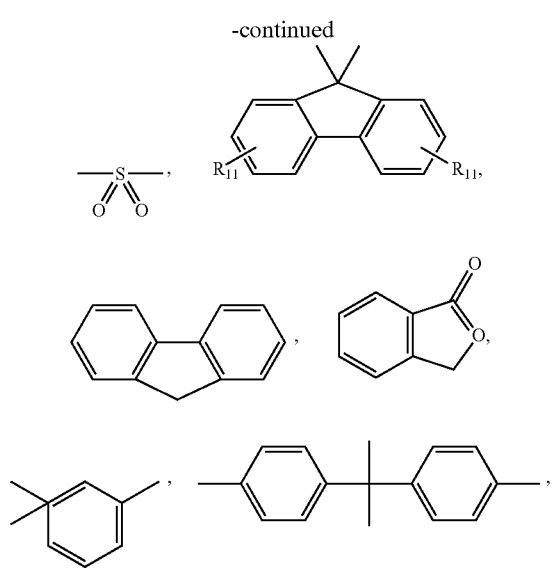

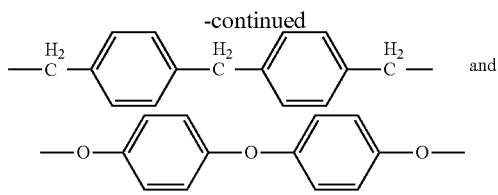
and

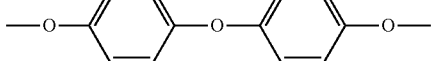

wherein $R_{10}$, $R_{11}$ are independently a hydrogen, halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group to provide the polycarbonate-polysiloxane copolymer.

DESCRIPTION OF THE EMBODIMENTS

The present invention generally relates to siloxane compositions with hydrophilic substituents in the backbone and the polycarbonate-polysiloxane copolymers obtained therefrom that result in a decreased contact angle and an increased hemocompatibility.

In an aspect, the present invention herein is directed to an α,ω-functionalized polyoxyalkylene-siloxane polymer having the structural formula referred to as structural Formula (I):

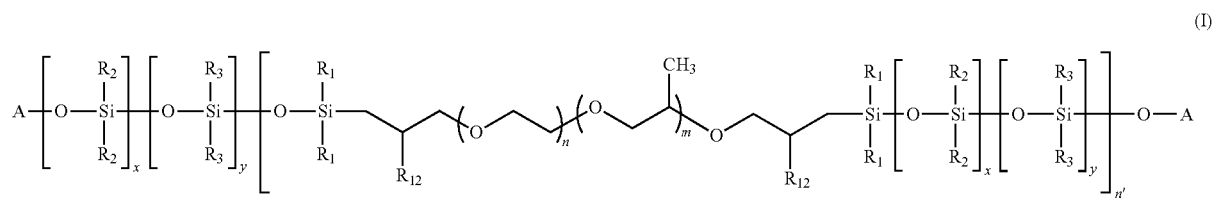
(I)

wherein each R, $R_1$, $R_2$ and $R_3$ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein at least one $R_2$ is different from at least one $R_3$; $R_{12}$ is independently hydrogen or methyl;

A is

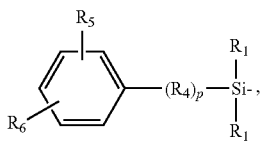

wherein $R_4$ is independently a divalent linear or branched alkylene group having from 1 to 10 carbon atoms, an aralkylene group having from 7 to 12 carbon atoms, an unsubstituted or substituted arylene group having from 6 to 18 carbon atoms, hydrocarbylene group having from 2 to 10 carbon atoms and containing at least one heteroatom of oxygen, $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms, $R_6$ is independently a hydroxyl group, an amine group, a carboxylic acid chloride group or a sulfonyl halide group, and the subscript p is an integer 0 or 1; and wherein m, n, n', x and y are integers, and wherein m is from 0 to 120, n is from 1 to 120, n' is from 1 to 10, x is from 1 to 300, and y is from 0 to 100, with the proviso that the sum of n+m is greater than or equal to 2.

In another aspect, the present invention is also directed to polymer blends including the α,ω-functionalized polyoxyalkylene-siloxane polymers described above.

In a further aspect, the present invention also provides for a method of preparing α,ω-functionalized polyoxyalkylene-siloxane polymers of the structural Formula (I), where p is 1, shown and described above. The method includes obtaining a hydride terminated siloxane from cyclic oligomers, e.g. a cyclic siloxane. The hydride terminated siloxanes can be obtained through ring opening polymerization of a cyclic siloxane with disiloxane hydride in presence of acidic and/or basic catalyst. In an embodiment, a hydride terminated siloxane is disclosed represented by the structural Formula (IV):

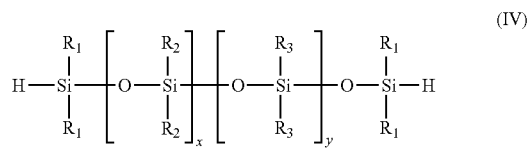

(IV)

wherein each R, $R_1$, $R_2$ and $R_3$ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein at least one $R_2$ is different from at least one $R_3$; and x is an integer from 1 to 300 and y is an integer from 0 to 100. The hydride terminated siloxane is reacted with bis-unsaturated polyalkylene containing terminal carbon-carbon double bonds in the presence of a hydrosilylation catalyst by means of step growth polymerization using hydrosilylation to obtain hydride terminated polyoxyalkylene siloxane represented by the structural Formula (V):

wherein each R, $R_1$, $R_2$ and $R_3$ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein $R_2$, and $R_3$ are not the same; $R_{12}$ is independently hydrogen or methyl; wherein m, n, n', x and y are integers, and wherein m is from 0 to 120, n is from 1 to 120, n' is from 1 to 10, x is from 1 to 300, and y is from 0 to 100, with the proviso that the sum of n+m is greater than or equal to 2. The hydride terminated polyoxyalkylene siloxane is then hydrosilylated to a substituted phenyl containing a carbon-carbon double bond, represented by the Formula (VI):

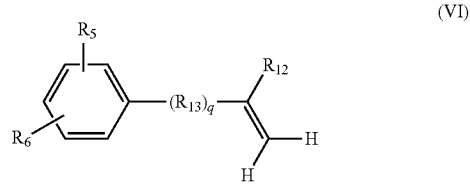

(VI)

wherein $R_{13}$ is independently a divalent linear or branched alkylene group having from 1 to 8 carbon atoms, an aralkylene group having from 7 to 10 carbon atoms, an unsubstituted or substituted arylene group having from 6 to 16 carbon atoms, hydrocarbylene group having from 2 to 8 carbon atoms and containing at least one heteroatom of oxygen, $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms, $R_6$ is independently a hydroxyl group, an amine group, a carboxylic acid chloride group or a sulfonyl halide group, and the subscript q is an integer 0 or 1, to obtain an α,ω-functionalized polyoxyalkylene-siloxane polymer having the structural Formula (I):

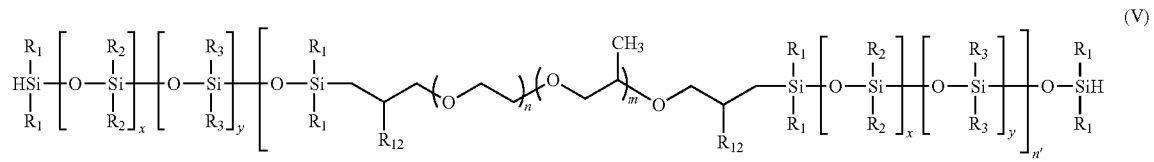

(V)

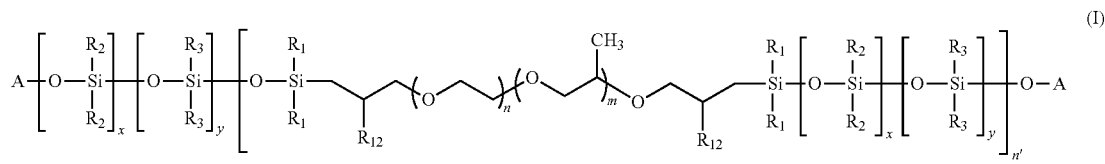

wherein each R, $R_1$, $R_2$ and $R_3$ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein at least one $R_2$ is different from at least one $R_3$; $R_{12}$ is independently hydrogen or methyl;

A is

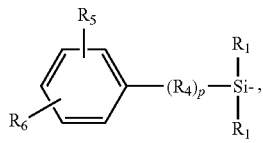

wherein $R_4$ is independently a divalent linear or branched alkylene group having from 1 to 10 carbon atoms, an aralkylene group having from 7 to 12 carbon atoms, an unsubstituted or substituted arylene group having from 6 to 18 carbon atoms, hydrocarbylene group having from 2 to 10 carbon atoms and containing at least one heteroatom of oxygen, $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms, $R_6$ is independently a hydroxyl group, an amine group, a carboxylic acid chloride group or a sulfonyl halide group, and the subscript p is 1; and wherein m, n, n', x and y are integers, and wherein m is from 0 to 120, n is from 1 to 120, n' is from 1 to 10, x is from 1 to 300, and y is from 0 to 100, with the proviso that the sum of n+m is greater than or equal to 2.

The obtained α,ω-functionalized polyoxyalkylene-siloxane polymers may further be purified to remove organics. The purification is conducted at a reduced pressure of less than 500 mmHg at a temperature of about 150 to 300° C. to obtain the α,ω-functionalized polyoxyalkylene-siloxane polymer with reduced volatile compounds.

In an embodiment, the present invention is also directed to a copolymer comprising the following structural unit Formula (II):

wherein each R, $R_1$, $R_2$ and $R_3$ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein at least one $R_2$ is different from at least one $R_3$; $R_{12}$ is independently hydrogen or methyl;

$A_1$ is

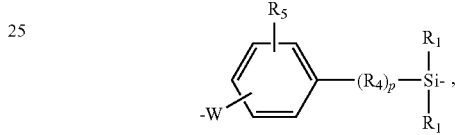

wherein $R_4$ is independently a divalent linear or branched alkylene group having from 1 to 10 carbon atoms, an aralkylene group having from 7 to 12 carbon atoms, an unsubstituted or substituted arylene group having from 6 to 18 carbon atoms, hydrocarbylene group having from 2 to 10 carbon atoms and containing at least one heteroatom of oxygen, $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms, W is independently a divalent group selected from the group consisting of —O—, —NR—, —C(=O)O— and —S(=O)$_2$O—, and the subscript p is an integer 0 or 1; and wherein m, n, n', x and y are integers, and wherein m is from 0 to 120, n is from 1 to 120, n' is from 1 to 10, x is from 1 to 300, and y is from 0 to 100, with the proviso that the sum of n+m is greater than or equal to 2.

In embodiments, Formula I is combined with a polycarbonate homopolymer, a polycarbonate copolymer, a polycarbonate-polyester, a polyester, polysulfones, polyethersulfones, polyetheretherketones, polyimides, and polyetherimides or combinations thereof to form a copolymer composition or polymer blend.

In further embodiments, the present invention is also directed to a composition, including α,ω-functionalized

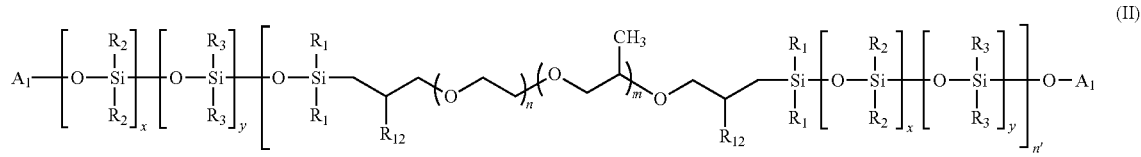

polyoxyalkylene-siloxane polymers of Formula (I) or a copolymer including the units of Formula (II) and structural Formula (VII):

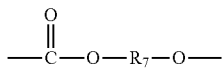
(VII)

wherein each $R_7$ is independently a hydrocarbon radical having 1 to 60 carbon atoms, a divalent hydrocarbon group, or a group derived from the structural unit having the Formula (IV):

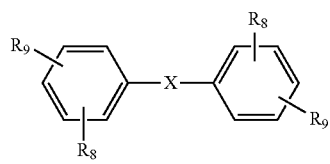
(IV)

where $R_8$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; and $R_9$ is independently a hydroxyl group, an amine group, an acid chloride group, or a sulfonyl halide group; and X is a compound represented by a structural formula selected from the group consisting of:

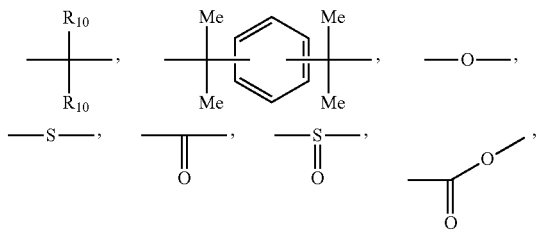

-continued

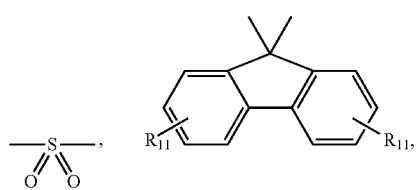

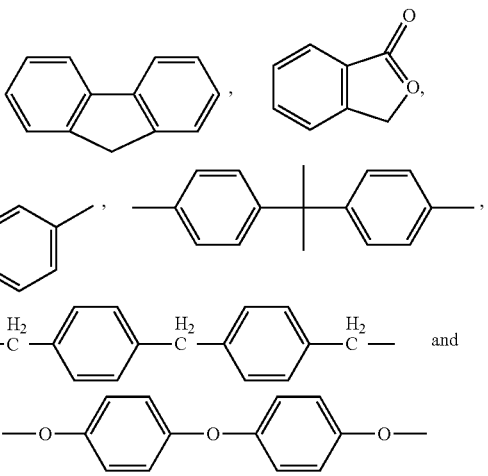

wherein $R_{10}$ and $R_{11}$ are independently a hydrogen, a halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group to provide the polycarbonate-polysiloxane copolymer.

In embodiments of the copolymer disclosed above $R_9$ can be an hydroxy group and $R_{10}$ can be an alkyl group of from 1 to 6 carbon atoms.

In an embodiment, the copolymer of the present invention may be prepared by polymerizing an α,ω-functionalized polyoxyalkylene-siloxane polymer and dihydroxyaromatic compound in the presence of a carbonate precursor, such as phosgene. In one embodiment, the dihydroxy aromatic compound is bisphenol A, and the α,ω-functionalized polyoxyalkylene-siloxane polymer is a polymer having the structural Formula (I):

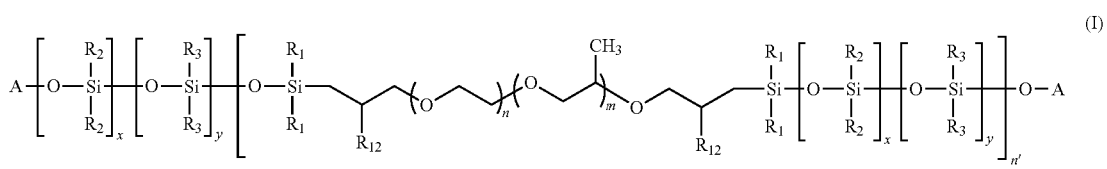
(I)

wherein each R, $R_1$, $R_2$ and $R_3$ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein at least one $R_2$ is different from at least one $R_3$; $R_{12}$ is independently hydrogen or methyl;

A is

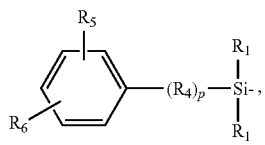

wherein $R_4$ is independently a divalent linear or branched alkylene group having from 1 to 10 carbon atoms, an aralkylene group having from 7 to 12 carbon atoms, an unsubstituted or substituted arylene group having from 6 to 18 carbon atoms, hydrocarbylene group having from 2 to 10 carbon atoms and containing at least one heteroatom of oxygen, $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms, $R_6$ is independently a hydroxyl group, an amine group, a carboxylic acid chloride group or a sulfonyl halide group, and the subscript p is an integer 0 or 1; and wherein m, n, n', x and y are integers, and wherein m is from 0 to 120, n is from 1 to 120, n' is from 1 to 10, x is from 1 to 300, and y is from 0 to 100, with the proviso that the sum of n+m is greater than or equal to 2.

The carbonate precursor may be chosen from phosgene, diphosgene, triphosgene and diarylcarbonates, bis(methylsalicyl)carbonate, or combinations thereof.

In embodiments, the polymerization reaction is an interfacial polymerization process conducted in the presence of a solvent and optionally one or more catalysts.

In further embodiments, the polymerization reaction is an interfacial polymerization process conducted in the presence of a solvent that includes chlorinated aliphatic organic liquid, methylene chloride, chloroform, carbon tetrachloride, 1,2-dichloroethane, trichloroethane, tetrachloroethane, dichloropropane, 1,2-dichloroethylene, chlorobenzene, dichlorobenzene, chlorine-containing aromatic solvents, toluene, various chlorotoluenes and the like, aqueous solvents such as de-ionized water and optionally one or more catalysts.

In embodiments, the polymerization reaction is an interfacial polymerization process conducted in the presence of a solvent, a caustic, and optionally one or more catalysts. The carbonate precursor may be phosgene, diphosgene and diarylcarbonates, bis(methylsalicyl)carbonate, or a combination thereof. Suitable catalysts for the interfacial polymerization reaction may include aliphatic amines such as tertiary amine catalysts, trialkylamine; phase transfer catalyst such as catalysts of the formula $(X_3)_4L^+Y^-$, wherein each X is independently an alkyl group having 1 to 26 carbon atoms, an aralkyl group having 7 to 20 carbon atoms or an aryl group having 6 to 12 carbon atoms; L is a nitrogen or phosphorus atom; and Y is a halide, or an alkoxy group having 1 to 8 carbon atoms or an aryloxy group having 6 to 18 carbon atoms. Combinations of such catalysts are also effective.

In an embodiment, the polymerization reaction may be performed by reacting dihydroxyaromatic compounds, such as bisphenol A, with triphosgene in a biphasic solvent in the presence of a phase transfer catalyst to form a bischloroformate; and adding the α,ω-functionalized polyoxyalkylene-siloxane polymer to form the copolymer. In embodiments, chloroformates of dihydroxy aromatic compounds are formed in a tube reactor, and then added into an interfacial polycondensation reactor with a catalyst.

Articles of manufacture can be made using the copolymers of the present invention, and particularly using polymer blend compositions containing the copolymers of the invention (for example, in combination with a polycarbonate homopolymer). In an embodiment, polymer blend compositions may comprise copolymers of the present invention in amounts from about 0.01 weight percent to about 25 weight percent, preferably about 0.01 weight percent to about 10 weight percent and more preferably about 0.01 weight percent to about 7 weight percent, based on the sum of the weight of the copolymer of the present invention and thermoplastic resin, such as polycarbonate homopolymer.

Examples of such articles of manufacture include but are not limited to medical articles, medical tubes, medical bags, mobile phone housings, frozen food service equipment, personal safety applications including helmets, automotive and motorcycle windshields, automotive sunroofs, other automotive applications including dashboards allowing for robust airbag deployment without fragmenting, and automotive headlamp or electronics screen applications, where clarity, flame retardance, and impact resistance are beneficial.

In specific embodiments, the α,ω-functionalized polyoxyalkylene-siloxane polymer of Formula (I) and the structure unit of Formula (II) of the copolymer are defined wherein R is independently hydrogen, an alkyl group of from 1 to 4 carbon atoms or phenyl and more specifically methyl; $R_1$ is independently an alkyl group of from 1 to 4 carbon atoms or phenyl and more specifically methyl; $R_2$ is independently an alkyl group of from 1 to 4 carbon atoms or phenyl and more specifically methyl, $R_3$ is independently an alkyl group of from 1 to 16 carbon atoms, phenyl, 2-phenylethyl, 2,2-diphenylethyl, 2-phenyl-2-methylethyl, 3-phenylpropyl, 3-phenyl-2-methylpropyl, or phenyl-4-oxabutyl, and more specifically methyl or phenyl, and even more specifically, phenyl; $R_4$ is independently an alkylene group of 1 to 6 carbon atoms, more specifically —CH$_2$—, —CH$_2$CH$_2$—, —CH(CH$_3$)CH$_2$—, —CH$_2$CH$_2$CH$_2$—, —CH$_2$CH(CH$_3$)CH$_2$— or —CH$_2$C(CH$_3$)$_2$CH$_2$CH$_2$—, and even more specifically —CH$_2$CH$_2$CH$_2$—; $R_5$ is independently hydrogen, chloro, methoxy, ethoxy and more specifically hydrogen or methoxy; $R_6$ is independently —OH, —NH$_2$ or —C(=O)Cl, and more specifically —OH; W is —O— or —NH— and more specifically —OH; $R_{12}$ is methyl; $R_{13}$ is —CH$_2$—; the subscripts m, n, n', p, q, x and y are integers, where m is from 0 to 100 and more specifically from 0 to 60, and even more specifically from 1 to 15; n is from 1 to 100, more specifically n is from 1 to 60 and even more specifically, n is from 5 to 30; n' is from 1 to 6, and even more specifically from 1 to 3; p is 1; q is 1; x is from 1 to 275, more specifically from 1 to 250, and even more specifically from 3 to 25; and y is from 0 to 80, more specifically from 0 to 40 and even more specifically from 0 to 25.

In an embodiment, the α,ω-functionalized polyoxyalkylene-siloxane polymer of Formula (I) and the structure unit of Formula (II) of the copolymer are define wherein R is hydrogen; $R_1$ is methyl; $R_2$ is methyl, $R_3$ is independently methyl or phenyl and more specifically phenyl; $R_4$ is —CH$_2$CH$_2$—, —CH(CH$_3$)CH$_2$—, —CH$_2$CH$_2$CH$_2$— or —CH$_2$CH(CH$_3$)CH$_2$—; $R_5$ is independently hydrogen or methoxy; $R_6$ is —OH; W is —O—; the subscripts m, n, n', p, q, x and y are integers, where m is from 0 to 100; n is from 1 to 100; n' is from 1 to 3; p is 1; q is 1; x is from 1 to 275; and y is from 0 to 80.

Specific embodiments will now be described in detail. These examples are intended to be illustrative, and not limited to the materials, conditions, or process parameters set forth in these embodiments. All parts are percentages by solid weight unless otherwise indicated.

EXAMPLES

The Examples described below illustrate the invention:

Example 1

Synthesis of α,ω-bis-[3-(4-hydroxy-3-methoxyphenyl)propyl-terminated polydimethylsiloxane-polyalkylene oxide polymer Into a round bottom flask equipped with a condenser and nitrogen line, was charged octamethyltetracyclosiloxane ($D_4$, 200 grams, 0.674 mole), 15 grams of 1,1,3,3-tetramethyldisiloxane, (TMDS, 0.112 mole), and a few drops of concentrated $H_2SO_4$ catalyst. The reaction mixture was heated to 60° C. and stirred under $N_2$ overnight. Thereafter, reaction mixture was neutralized and filtered through Celite filtering aid. The residual low boiling components were removed under elevated temperatures and reduced pressure (150° C./5 mbar) to give a colorless viscous fluid of $^HMD_{35}M^H$, where M is $H(CH_3)_2SiO_{1/2}$ and D is $(CH_3)_2SiO_{2/2}$.

Into a 250-ml round bottom flask was charged 100 grams (0.036 mole) of $^HMD_{35}M^H$, and 2-methylprop-1-enyl-terminated poly(ethylene oxide/propylene oxide)polymer containing 60 weight percent ethylene oxide and 40 weight percent propylene oxide (60H1500, 0.018 mole) and 0.065 grams of Speier's catalyst ($H_2PtCl_6$). The reaction mixture was heated at 110° C. for 10 hours, cooled and filtered through diatomaceous earth. The residual materials were removed under reduced pressure (150° C./5 mbar) to give a colorless very viscous fluid of Si—H terminated polysiloxane-polyethylene blocked copolymer having the nominal structure, H—Si$(Ch_3)_2$[OSi$(Ch_3)_2]_{35}$OSi$(CH_3)_2$—$CH_2CH(CH_3)CH_2(OCH_2CH_2)_{20}(OCH_2CH(CH_3))_{10}$—$OCH_2CH(CH_3)CH_2Si((CH_3)_2[OSi(CH_3)_2]_{35}OSi(CH_3)_2$—H.

Into a 250 mL reaction flask was charged with 100 grams of the Si—H terminated polysiloxane-polyethylene blocked copolymer prepared above and 0.065 grams of Speier's catalyst ($H_2PtCl_6$). The mixture was stirred under $N_2$, and heated to 80° C. Thereafter, stoichiometric amount of eugenol (0.036 moles) were charged to an addition funnel and added drop-wise at a rate to maintain a reaction temperature of 100° C. Following the addition, the reaction was heated to 120° C. and maintained for 2 hours. The reaction mixture was allowed to cool to room temperature, treated with Celite filtering aid and filtered. The residual materials were removed under reduced pressure (150° C./5 mbar) to give a colorless very viscous fluid having the nominal structure, A-Si$(CH_3)_2$[OSi$(CH_3)_2]_{35}$OSi$(CH_3)_2CH_2CH(CH_3)CH_2(OCH_2CH_2)_n$—$(OCH_2CH(CH_3)_mOCH_2CH(CH_3)CH_2[OSi(CH_3)_2]_{35}OSi(CH_3)$-A, where A is

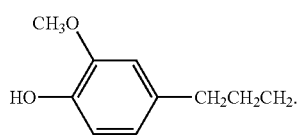

The structural information is presented in Table 1.

Example 2

Synthesis of α,ω-bis-[3-(4-hydroxy-3-methoxyphenyl)propyl-terminated polydimethylsiloxane-polyalkylene oxide polymer Example 2 is a repeat of Example 1. The structural information is presented in Table 1.

Example 3

Synthesis of α,ω-bis-[3-(4-hydroxy-3-methoxyphenyl)propyl-terminated polydimethylsiloxane-polyalkylene oxide polymer Example 3 prepared a α,ω-bis-[3-(4-hydroxy-3-methoxyphenyl)propyl-terminated polydimethylsiloxane-polyalkylene oxide polymer in accordance with the procedure of Example 1, except a 2-methylprop-1-enyl-terminated poly (ethylene oxide/propylene oxide) polymer containing 50 weight percent ethylene oxide and 50 weight percent propylene oxide was used. The structural information is presented in Table 1.

Example 4

Synthesis of α,ω-bis-[3-(4-hydroxy-3-methoxyphenyl)propyl-terminated poly(dimethylsiloxane/diphenylsiloxane)-polyalkylene oxide polymer Example 4 prepared α,ω-bis-[3-(4-hydroxy-3-methoxyphenyl)propyl-terminated poly(dimethylsiloxane/diphenylsiloxane)-polyalkylene oxide polymer according to the procedure in Example 1, except the starting silicon hydride-terminated poly(dimethylsiloxane/diphenylsiloxane) had the chemical structure, H—Si$(CH_3)_2$[OSi$(CH_3)_2]_{21}$[OSi$(C_6H_5)_2]_2$OSi$(CH_3)_2$—H and the 2-methylprop-1-enyl-terminated poly(ethylene oxide/propylene oxide) polymer containing 50 weight percent ethylene oxide and 50 weight percent propylene oxide was used. The structural information is presented in Table 1.

Example 5

Synthesis of α,ω-bis-[3-(4-hydroxy-3-methoxyphenyl)propyl-terminated poly(dimethylsiloxane/diphenylsiloxane)-polyalkylene oxide polymer Example 5 prepared α,ω-bis-[3-(4-hydroxy-3-methoxyphenyl)propyl-terminated poly(dimethylsiloxane/diphenylsiloxane)-polyalkylene oxide polymer according to the procedure in Example 1, except the starting silicon hydride-terminated poly(dimethylsiloxane/diphenylsiloxane) had the chemical structure, H—Si$(CH_3)_2$[OSi$(CH_3)_2]_{24}$[OSi$(C_6H_5)_2]_4$OSi$(CH_3)_2$—H and the 2-methylprop-1-enyl-terminated poly(ethylene oxide/propylene oxide) polymer containing 50 weight percent ethylene oxide and 50 weight percent propylene oxide was used. The structural information is presented in Table 1.

COMPARATIVE EXAMPLE

The following is a Comparative Example:

Comparative Example A

Into a round bottom flask was charged 100 grams of a silicon hydride-terminated poly(dimethylsiloxane) having the structure $M^H D_{45} M^H$ (0.029 moles) and 0.065 grams of Speier's catalyst ($H_2PtCl_6$). The mixture was stirred under $N_2$, and heated to 80° C. Thereafter, stoichiometric amount of eugenol (0.058 moles) were charged to an addition funnel and added drop-wise at a rate to maintain a reaction temperature of 100° C. Following the addition, the reaction was heated to 120° C. and maintained for 2 hours. The reaction mixture was allowed to cool to room temperature, treated with Celite filtering aid and filtered. The residual materials were removed under reduced pressure (150° C./5 mbar) to give a colorless very viscous fluid. The structural information is presented in Table 1.

TABLE 1

Structural information on the α,ω- functionalized polyoxyalkylene-siloxane polymers prepared according to Examples 1 to 5 and Comparative Example A.

| Reactions | $R_1$ | $R_2$ | $R_3$ | x | y | PEG's | MW | PDI | Viscosity (Pas) | $T_d$ (° C.) | $T_g$ (° C.) | RI |
|---|---|---|---|---|---|---|---|---|---|---|---|---|
| Example 1 | Me | — | — | 35 | — | PEG-1 | 8,500 | 2.26 | 8.942 | — | — | — |
| Example 2 | Me | — | — | 35 | — | — | — | — | 8.003 | — | — | — |
| Example 3 | Me | — | — | 35 | — | PEG2 | 5,130 | 2.42 | 9.243 | 405 | −119, −79 | 1.4376 |
| Example 4 | Me | Me | Ph | 21 | 2 | — | 7,100 | 2.92 | 0.785 | 397 | −76 | 1.4566 |
| Example 5 | Me | Me | Ph | 24 | 4 | — | 13,000 | 2.20 | 9.535 | 379 | −114 | 1.4690 |
| Comparative Example A | Me | — | — | 45 | — | — | 5,700 | 1.32 | 0.097 | 448 | −118 | 1.4210 |

Me: Methyl,
Ph: phenyl;
PEG1 (bismethallyl polyalkyleneglycol, MW 3000 with 60% EO);
PEG2 (bismethallyl polyalkyleneglycol, MW 3000 with 50% EO);
MW: weight average molecular weight, PDI: polydispersity both values obtained from GPC calibrated with PS standards with Chloroform as eluent at 1 ml/minute.;
Comparative example 1 $^{Eu}MD_{45}M^{Eu}$;
Eu— eugenol

Example 6

Synthesis of Polycarbonate/α,ω-Functionalized Polyoxyalkylene-Siloxane Copolymers 9.132 grams of bis-phenol-A (BPA), 2.283 grams of α,ω-functionalized polyoxyalkylene-siloxane polymer prepared in Example 1 and 0.113 grams of phase transfer catalyst, phenyltriethylammonium chloride, were added to a four necked round bottom flask containing 50 mL each of water and dichloromethane. 7.56 grams of triphosgene was weighed in a glass vial under nitrogen atmosphere, dissolved in 25 ml of dichloromethane, and transferred to an addition funnel connected to the round bottom flask. 25 mL of 25-30 weight percent NaOH aqueous solution was transferred to a second additional funnel fixed in the reactor. Both triphosgene and the aqueous NaOH solution were added to the reaction mixture simultaneously with vigorous stirring, with the stirring blade rotating at 300-400 rpm. The addition of the aqueous NaOH solution was carefully added in such a way that the pH of the reaction mixture was maintained between 5 and 6. After the addition of the aqueous NaOH solution, the stirring was continued for another 40 to 60 minutes. The pH of the solution was increased to a pH of 10-11 using the aqueous NaOH solution. The reaction mixture was stirred for an additional 5-10 minutes. 0.2123 grams of 4-cumyl phenol (para-cumyl-phenol) and 50.6 milligrams of triethyl amine were added, the mixture was stirred for an additional 5-10 minutes, and the pH was adjusted to a pH of 12 by adding the aqueous NaOH solution. The reaction was stopped and the organic layer was separated from aqueous layer using a separating funnel. The polymer (organic layer) was washed with 1N HCl and precipitated in 3 to 4 liters of methanol. The final product was dried overnight in a vacuum oven under reduced pressure and a temperature of 60-70° C. The compositional data are presented in Table 2, and referred to as PC-Siloxane-Copolymer-1.

Examples 7-9 and Comparative Example B

A series of polycarbonate/α,ω-functionalized polyoxyalkylene-siloxane copolymers were prepared using the α,ω-functionalized polyoxyalkylene-siloxane copolymers of Examples 2, 3 and 5 and Comparative Example A and in accordance with the procedure of Example 6. The compositional data are presented in Table 2.

TABLE 2

Compositional data on the polycarbonate/α,ω-functionalized polyoxyalkylene-siloxane copolymers.

| Samples | Siloxane fluid (wt %) in copolymer | $M_w$ (SEC) | PDI | % end-capped of copolymer | $T_g$ | $T_d$ |
|---|---|---|---|---|---|---|
| PC-Siloxane-Copolymer - 1 (using example 1) | 7.10 | 28,000 | 1.75 | 84.7 | 148 | 474 |
| PC-Siloxane-Copolymer - 2 (using example 2) | 9.20 | 89,800 | 2.10 | 85.1 | 149 | 483 |
| PC-Siloxane-Copolymer - 3 (using example 3) | 9.9 | 49133 | 2.50 | 63.0 | 121 | 440 |

TABLE 2-continued

Compositional data on the polycarbonate/α,ω-functionalized polyoxyalkylene-siloxane copolymers.

| Samples | Siloxane fluid (wt %) in copolymer | $M_w$ (SEC) | PDI | % end-capped of copolymer | $T_g$ | $T_d$ |
|---|---|---|---|---|---|---|
| PC-Siloxane-Copolymer - 5 (using example 5) | 11 | 51,368 | 2.40 | 82 | 144 | 423 |
| PC-Siloxane-Copolymer - 6 (using comparative example A) | 7.0 | 64852 | 1.50 | 91 | 149 | 471 |
| PC homopolymer | — | 106492 | >2.0 | 97.6 | 154 | 476 |

$M_W$: weight average molecular weight,
PDI: polydispersity both values obtained from GPC calibrated with PS standards with chloroform as eluent at 1 ml/minute.

Example 10

Preparation of Polycarbonate-Polycarbonate/Polycarbonate/α,ω-Functionalized Polyoxyalkylene-Siloxane Copolymers Blends Five weight percent of the polycarbonate/α,ω-functionalized polyoxyalkylene-siloxane copolymers made above were melt blended in Haake batch mixer with approximately 95 weight percent of polycarbonate at 270-290° C. for 7 minutes. The molten strands were collected and used for morphological characterization followed by preparation of a molded article therefrom.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:

1. An α,ω-functionalized polyoxyalkylene-siloxane polymers having the structural Formula (I):

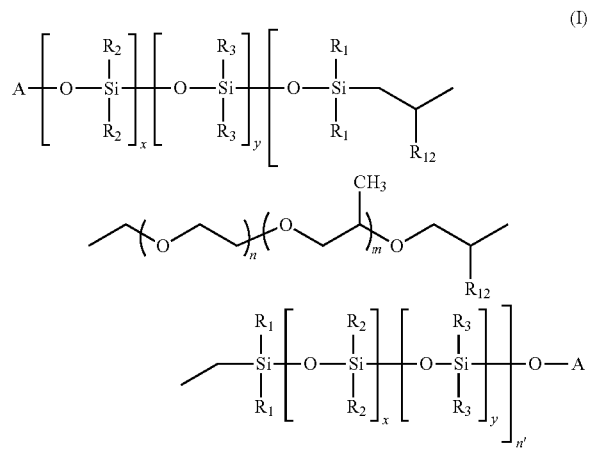

wherein each $R_1$, $R_2$ and $R_3$ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein at least one $R_2$ is different from at least one $R_3$;

$R_{12}$ is independently hydrogen or methyl;

A is

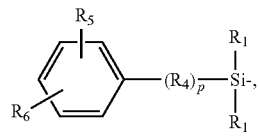

wherein $R_4$ is independently a divalent linear or branched alkylene group having from 2 to 10 carbon atoms, an aralkylene group having from 8 to 12 carbon atoms, an unsubstituted or substituted arylene group having from 8 to 18 carbon atoms, or a hydrocarbylene group having from 2 to 10 carbon atoms and containing at least one oxygen heteroatom, $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms, $R_6$ is independently a hydroxyl group, an amine group, a carboxylic acid chloride group or a sulfonyl halide group, and p is 1;

wherein m, n, n', x and y are integers, and wherein m is from 0 to 120, n is from 1 to 120, n' is from 1 to 10, x is from 1 to 300, and y is from 0 to 100, with the proviso that the sum of n+m is greater than or equal to 2.

2. The α,ω-functionalized polyoxyalkylene-siloxane polymer of claim 1, wherein $R_1$ is independently an alkyl group of from 1 to 4 carbon atoms or phenyl; $R_2$ is independently an alkyl group of from 1 to 4 carbon atoms or phenyl; $R_3$ is independently an alkyl group of from 1 to 16 carbon atoms, phenyl, 2-phenylethyl, 2,2-diphenylethyl, 2-phenyl-2-methylethyl, 3-phenylpropyl, 3-phenyl-2-methylpropyl, or phenyl-4-oxabutyl; $R_4$ is independently an alkylene group of 2 to 6 carbon atoms; $R_5$ is independently hydrogen, chloro, methoxy, ethoxy; $R_6$ is independently —OH, —$NH_2$ or —C(=O)Cl; $R_{12}$ is methyl; wherein m, n, n', p, x and y are integers, and wherein m is from 0 to 100; n is from 1 to 100; n' is from 1 to 6; p is 1; x is from 1 to 275; and y is from 0 to 80.

3. The α,ω-functionalized polyoxyalkylene-siloxane polymer of claim 2, wherein $R_1$ is methyl; $R_2$ is methyl, $R_3$ is independently methyl or phenyl; $R_4$ is —$CH_2CH_2$—, —$CH(CH_3)CH_2$—, —$CH_2CH_2CH_2$— or —$CH_2CH(CH_3)$ CH₂—; R₅ is independently hydrogen or methoxy; R₆ is —OH; wherein m, n, n', p, x and y are integers, and wherein m is from 0 to 100; n is from 1 to 100; n' is from 1 to 3; p is 1; x is from 1 to 275; and y is from 0 to 80.

4. A composition comprising an α,ω-functionalized polyoxyalkylene-siloxane polymer of claim 1 and at least one polymer selected from the group consisting of polycarbonate homopolymers, polycarbonate copolymers, polycarbonate-polyesters, polyesters, polysulfones, polyethersulfones, polyetheretherketones, polyimides and polyetherimides and combinations thereof.

5. An article comprising the composition of claim 4, wherein the article is one or more of a medical article, a medical tube, a medical bag, a mobile phone housing, a frozen food service equipment article, a helmet, an automotive windshield, a motorcycle windshield, an automotive sunroof, a dashboard, a headlamp, or an electric screen.

6. A method of making an article comprising molding, shaping, or forming the composition of claim 4 into the article.

7. A method preparing an α,ω-functionalized polyoxyalkylene-siloxane polymers having the structural Formula (I):

wherein R₄ is independently a divalent linear or branched alkylene group having from 2 to 10 carbon atoms, an aralkylene group having from 8 to 12 carbon atoms, an unsubstituted or substituted arylene group having from 8 to 18 carbon atoms, or a hydrocarbylene group having from 2 to 10 carbon atoms and containing at least one oxygen heteroatom, R₅ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms, R₆ is independently a hydroxyl group, an amine group, a carboxylic acid chloride group or a sulfonyl halide group, and p 1;

wherein m, n, n', x and y are integers, and wherein m is from 0 to 120, n is from 1 to 120, n' is from 1 to 10, x is from 1 to 300, and y is from 0 to 100, with the proviso that the sum of n+m is greater than or equal to 2, comprising:

(a) reacting a hydride terminated siloxane represented by the structural Formula (IV):

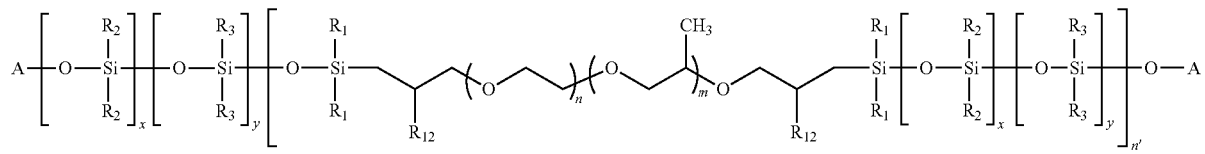

(I)

wherein each R₁, R₂ and R₃ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein at least one R₂ is different from at least one R₃;

R₁₂ is independently hydrogen or methyl;

A is

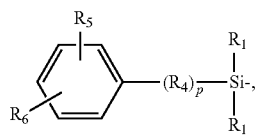

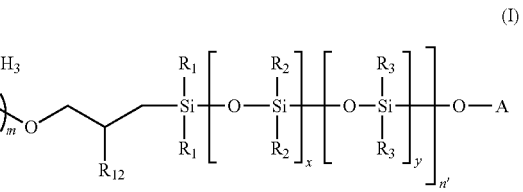

(IV)

wherein each R₁, R₂ and R₃ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein at least one R₂ is different from at least one R₃; and x is an integer from 1 to 300 and y is an integer from 0 to 100 with bis-unsaturated polyalkylene containing terminal carbon-carbon double bonds in the presence of a hydrosilylation catalyst to obtain hydride terminated polyoxyalkylene siloxane represented by the structural Formula (V):

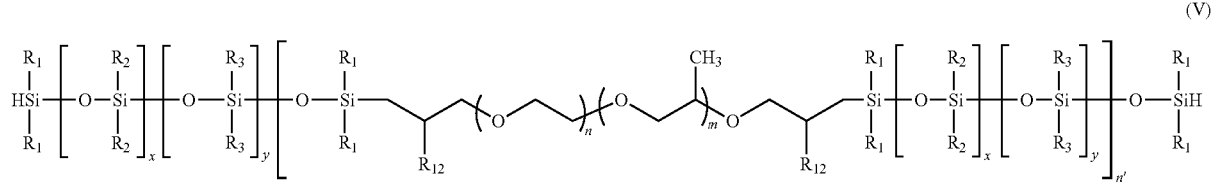

(V)

wherein each $R_1$, $R_2$ and $R_3$ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein $R_2$ and $R_3$ are not the same;

$R_{12}$ is independently hydrogen or methyl;

wherein m, n, n', x and y are integers, and wherein m is from 0 to 120, n is from 1 to 120, n' is from 1 to 10, x is from 1 to 300, and y is from 0 to 100, with the proviso that the sum of n+m is greater than or equal to 2; and (b) reacting the hydride terminated polyoxyalkylene siloxane of step (a) with substituted phenyl containing a carbon-carbon double bond, represented by the Formula (VI):

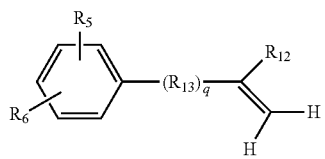

wherein $R_{12}$ is independently hydrogen or methyl; $R_{13}$ is independently a divalent linear or branched alkylene group having from 1 to 8 carbon atoms, an aralkylene group having from 7 to 10 carbon atoms, an unsubstituted or substituted arylene group having from 6 to 16 carbon atoms, a hydrocarbylene group having from 2 to 8 carbon atoms and containing at least one heteroatom of oxygen, $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms, $R_6$ is independently a hydroxyl group, an amine group, a carboxylic acid chloride group or a sulfonyl halide group, and the subscript q is an integer 0 or 1, to obtain an α,ω-functionalized polyoxyalkylene-siloxane polymer.

8. The method of claim 7, further comprising purifying the α,ω-functionalized polyoxyalkylene-siloxane polymer.

9. A copolymer comprising a structural unit of Formula (II):

wherein each $R_1$, $R_2$ and $R_3$ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein at least one $R_2$ is different from at least one $R_3$;

$R_{12}$ is independently hydrogen or methyl;

$A_1$ is

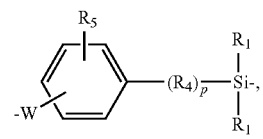

wherein $R_4$ is independently a divalent linear or branched alkylene group having from 2 to 10 carbon atoms, an aralkylene group having from 8 to 12 carbon atoms, an unsubstituted or substituted arylene group having from 8 to 18 carbon atoms, or a hydrocarbylene group having from 2 to 10 carbon atoms and containing at least one oxygen heteroatom, $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms, W is independently a divalent group selected from the group consisting of —O—, —NR—, —C(=O)O— and —S(=O)$_2$O—, and the subscript p is 1;

wherein m, n, n', x and y are integers, wherein m is from 0 to 120, n is from 1 to 120, n' is from 1 to 10, x is from 1 to 300, and y is from 0 to 100, with the proviso that the sum of n+m is greater than or equal to 2.

10. The copolymer of claim 9, further comprising a structural unit having the Formula (VII)

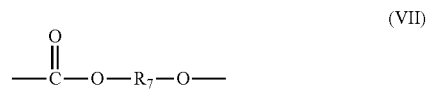

wherein each $R_7$ is a hydrocarbon radical having 1 to 60 carbon atoms, a divalent hydrocarbon group, a group derived from the structural unit having the Formula (III):

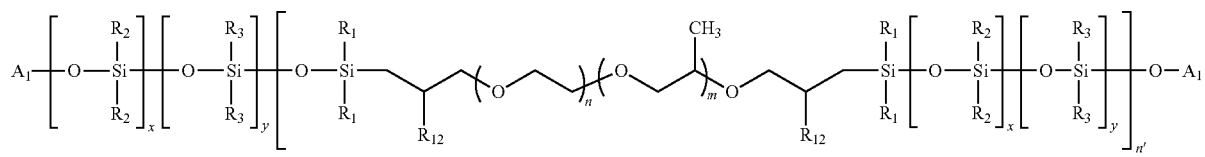

(III)

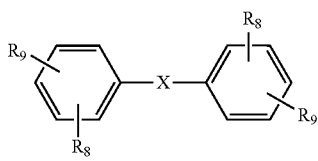

where $R_8$ is independently a hydrogen, a halogen, an aliphatic group having from 1 to 6 carbon atoms, an aromatic group having from 6 to 8 carbon atoms, an alkoxy group having from 1 to 6 carbon atoms, or an aryloxy group; and $R_9$ is independently a hydroxyl group, an amine group, an acid chloride group, or a sulfonyl halide group; and X is a compound represented by a structural formula selected from the group consisting of:

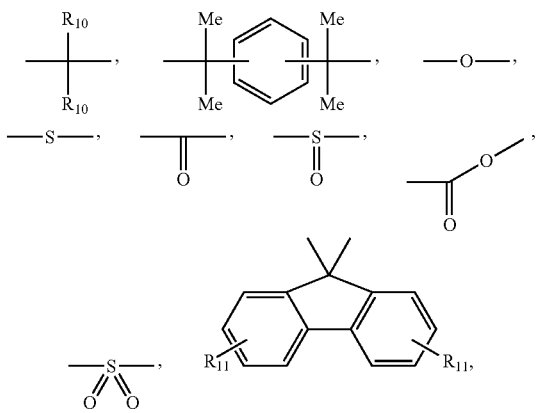

-continued

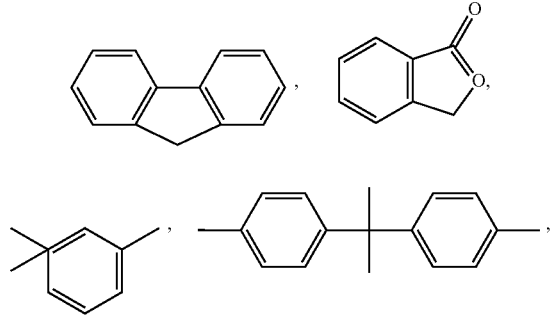

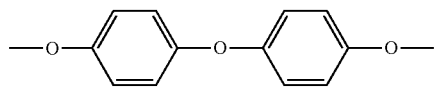

wherein $R_{10}$, $R_{11}$ are independently a hydrogen, halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group.

11. A composition comprising the copolymer of claim 9 and at least one of a polycarbonate homopolymer, a polycarbonate-polyester, a polyester, a polysulfone, a polyethersulfone, a polyetheretherketone, a polyimide, a polyetherimide, a polycarbonate copolymer.

12. An article comprising the composition of claim of claim 11, wherein the article is one or more of a medical article, a medical tube, a medical bag, a mobile phone housing, a frozen food service equipment, a helmet, an automotive windshield, a motorcycle windshield, an automotive sunroof, a dashboard, a headlamp, or an electric screen.

13. A method of making an article comprising: molding, shaping, or forming a composition of claim 11 to obtain the article.

14. A method of preparing a copolymer comprising polymerizing α,ω-functionalized polyoxyalkylene-siloxane polymer is a polymer having the structural Formula (I):

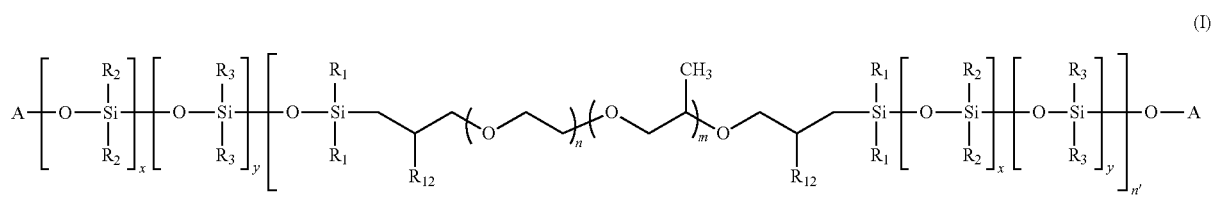

(I)

wherein each $R_1$, $R_2$ and $R_3$ is independently a linear or branched aliphatic group containing from 1 to 20 carbon atoms, a substituted or unsubstituted aryl group containing 6 to 16 carbon atoms, an alicyclic group containing 3 to 16 carbon atoms, a heteronuclear aromatic group containing 3 to 16 carbon atoms, a hydrocarbyl group having from 3 to 16 carbon atoms and containing at least one heteroatom of oxygen, nitrogen or sulfur and/or containing at least one ester, nitrile or halo group, wherein at least one $R_2$ is different from at least one $R_3$;

$R_{12}$ is independently hydrogen or methyl;

A is

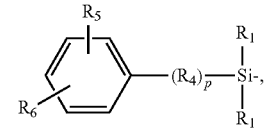

wherein R₄ is independently a divalent linear or branched alkylene group having from 2 to 10 carbon atoms, an aralkylene group having from 8 to 12 carbon atoms, an unsubstituted or substituted arylene group having from 8 to 18 carbon atoms, or a hydrocarbylene group having from 2 to 10 carbon atoms and containing at least one oxygen heteroatom, $R_5$ is independently a hydrogen, a halogen, an aliphatic group containing from 1 to 12 carbon atoms, an aromatic group containing from 6 to 12 carbon atoms, an alkoxy group containing form 1 to 12 carbon atoms or an aryloxy group containing from 6 to 12 carbon atoms, $R_6$ is independently a hydroxyl group, an amine group, a carboxylic acid chloride group or a sulfonyl halide group, and the subscript p is 1;

wherein m, n, n', x and y are integers, and wherein m is from 0 to 120, n is from 1 to 120, n' is from 1 to 10, x is from 1 to 300, and y is from 0 to 100, with the proviso that the sum of n+m is greater than or equal to 2, with a compound of Formula (III):

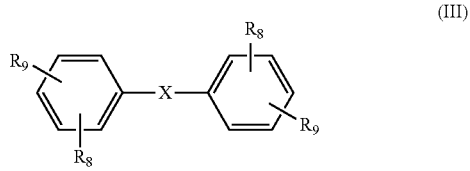

(III)

where $R_8$ is independently a hydrogen, a halogen, an aliphatic group having from 1 to 6 carbon atoms, an aromatic group having from 6 to 8 carbon atoms, an alkoxy group having from 1 to 6 carbon atoms, or an aryloxy group; and $R_9$ is independently a hydroxyl group, an amine group, an acid chloride group, or a sulfonyl halide group; and X is a compound represented by a structural formula selected from the group consisting of:

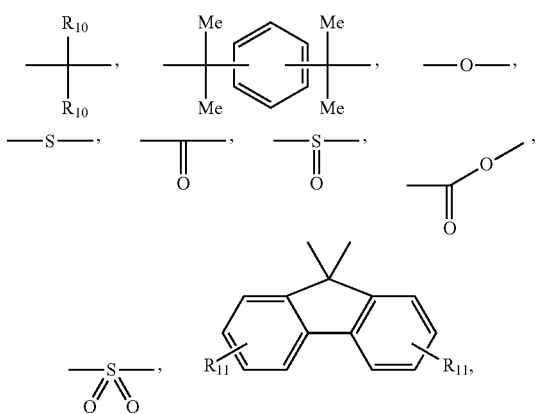

-continued

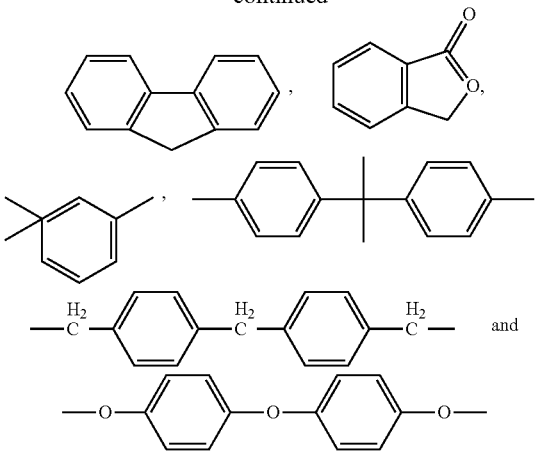

wherein $R_{10}$, $R_{11}$ are independently a hydrogen, halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group in the presence of a carbonate precursor.

15. The method of claim 14, wherein the carbonate precursor is chosen from phosgene, diphosgene, diarylcarbonates, bis(methylsalicyl)carbonate, or a combination thereof.

16. The method of claim 14, wherein the polymerizing step is an interfacial polymerization process conducted in the presence of a solvent and optionally one or more catalysts.

17. The method of claim 14, wherein the polymerizing step is an interfacial polymerization process conducted in the presence of a solvent, a caustic, and optionally one or more catalysts, and wherein the carbonate precursor is chosen from phosgene, diphosgene, triphosgene, diarylcarbonates, bis(methylsalicyl)carbonate, or a combination thereof.

18. The method of claim 14, wherein the polymerizing step comprises reacting bisphenol A with triphosgene in a biphasic solvent in the presence of a phase transfer catalyst to form a bischloroformate; and adding the α,ω-functionalized polyoxyalkylene-siloxane polymer to form the copolymer.

19. The method of claim 18, wherein the bischloroformate is formed in a tube reactor, and then added into an interfacial polycondensation reactor with a catalyst.

* * * * *